United States Patent [19]

Lombard

[11] 4,413,863

[45] Nov. 8, 1983

[54] HYDROSTATIC SUPPORT DEVICE

[75] Inventor: Jean Lombard, Boulogne sur Seine, France

[73] Assignee: Centre d'Etudes et de Recherches de la Machine-Outil (C.E.R.M.O.), France

[21] Appl. No.: 288,508

[22] Filed: Jul. 30, 1981

[30] Foreign Application Priority Data

Aug. 7, 1980 [FR] France ............... 80 17452

[51] Int. Cl.³ .................. F16C 32/06; F16C 39/06
[52] U.S. Cl. ........................ 308/5 R; 308/10
[58] Field of Search ................ 308/9, 5 R, DIG. 1, 308/170, 73, 10, 207; 361/143, 144, 145

[56] References Cited

U.S. PATENT DOCUMENTS

| 3,164,753 | 1/1965 | Schroeder | 361/145 X |
| 3,746,407 | 7/1973 | Stiles et al. | 308/10 X |
| 3,947,153 | 3/1976 | Matthias et al. | 308/10 X |

FOREIGN PATENT DOCUMENTS

| 194216 | 12/1957 | Austria | 308/5 R |
| 1353247 | 1/1964 | France | |
| 415188 | 6/1966 | Switzerland | |
| 1236411 | 6/1971 | United Kingdom | 308/10 |

Primary Examiner—Stuart S. Levy
Assistant Examiner—David J. Werner
Attorney, Agent, or Firm—Bacon & Thomas

[57] ABSTRACT

The invention relates to a hydrostatic support device placed between two elements movable one with respect to the other, comprising a hydrostatic guide-block, a magnet being mounted on one of the said elements, opposite the second element, so that the latter is traversed by the lines of magnetic forces pulling the second element towards the first element.

This device comprises a demagnetizing circuit associated to each magnet and constituted by an A.C.-supplied electro-magnet.

The present invention finds an application in the production of hydrostatic guide-blocks for use in the construction of machine-tools.

6 Claims, 4 Drawing Figures

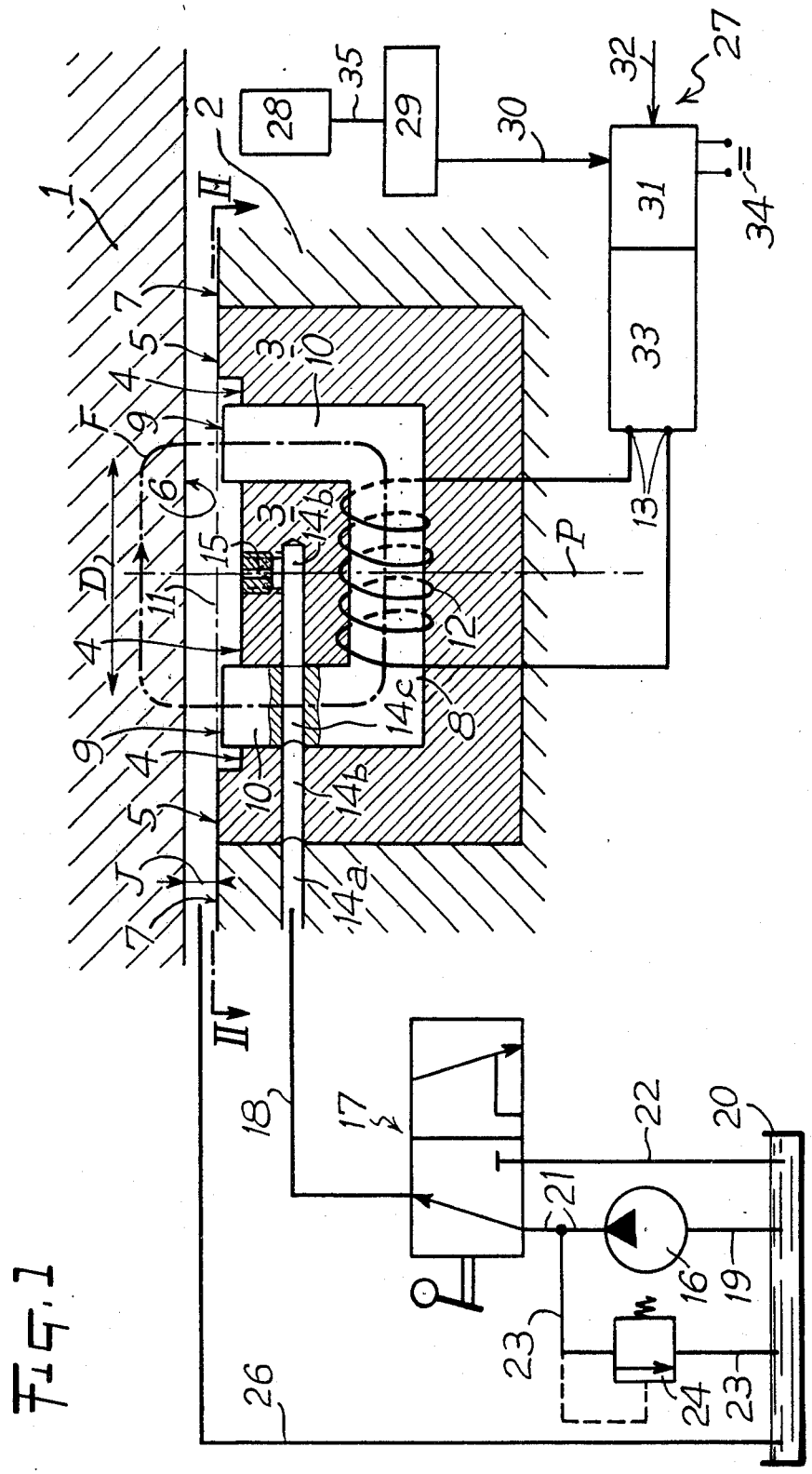

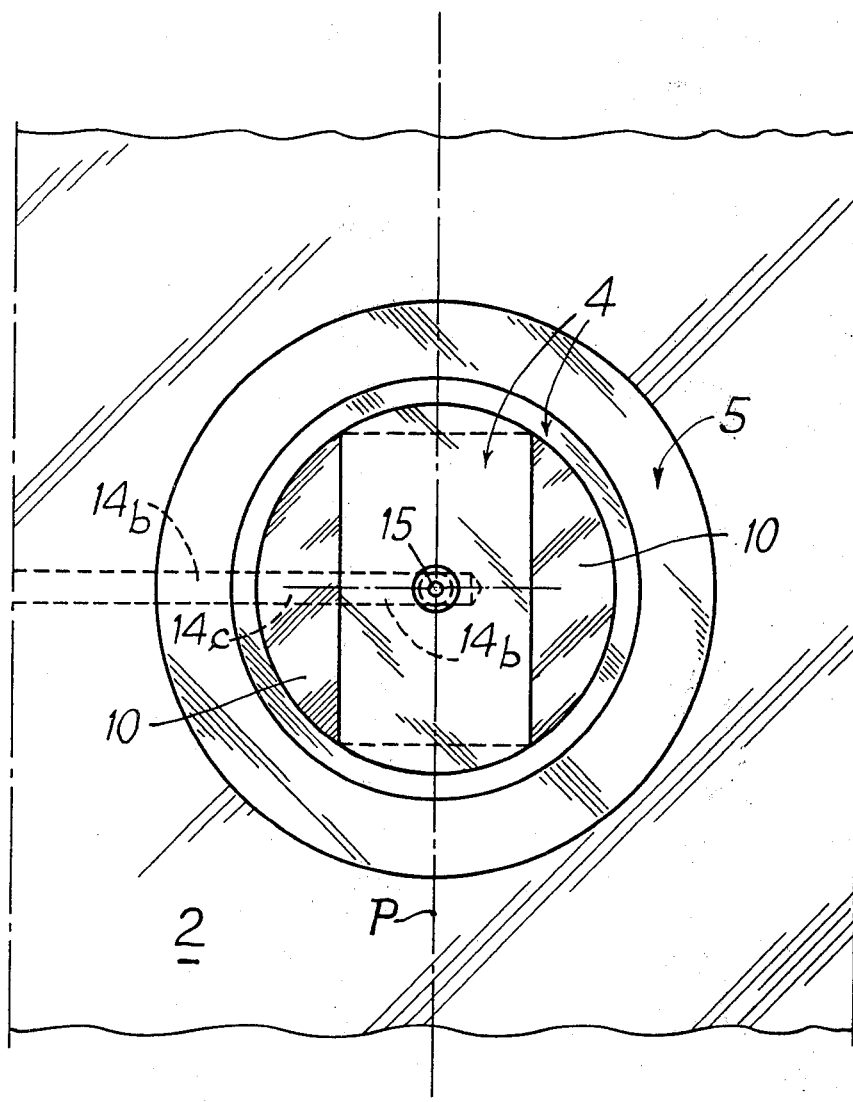

HYDROSTATIC SUPPORT DEVICE

Hydrostatic guide-blocks are known to have many possible applications, and in particular they are known to be used in the construction of rectilinear or circular guide ways in machine-tools, and to permit a high accuracy and regularity in the relative movements of two bodies, and a very important reduction of the friction forces, this being an undeniable advantage when the guide ways are called upon to support heavy loads.

The hydrostatic guide-blocks are supplied with pressurized fluid-special oils or compressed gas-thus permitting the constitution of a thick fluid film between the opposite faces of the guide ways to eliminate the influence on the guiding of any surface irregularities of said two faces.

The sole weight of the upper part does not always constitute an adequate permanent charge to ensure that the guide-blocks work properly. For this reason, and in order to obtain an adjustable and/or controllable load of the guide-blocks, measures have already been taken to complete their installation with electro-magnets capable of developing a preferably adjustable force of magnetic attraction between the elements supported by the hydrostatic guide-block or guide-blocks.

It should however be possible to demagnetize the facing elements so that, especially in the case of guide-blocks applied to the production of machine-tools, any metal chips resulting from machining operations are prevented from adhering to the guide ways of such machine-tools.

It is the object of the present invention to achieve this by proposing a hydrostatic support device placed between two elements movable with respect to one another, and comprising at least one hydrostatic guide-block, whereas at least one magnet is mounted on a first one of said elements, opposite the second one of said elements, so that said second element is traversed by the lines of magnetic forces of attraction of the second element towards the first element.

Said device comprises a demagnetizing circuit associated to each magnet and constituted by an electro-magnet supplied with alternative current.

The following advantageous arrangements are also preferably adopted:

the poles of the demagnetizing electro-magnet extend beyond each hydrostatic guide-block and are offset with respect to the active face of said guide-block;

a magnet is associated to each hydrostatic guide-block; it is mounted substantially symmetrically with respect to a median plane of said hydrostatic guide-block, perpendicular to the direction of relative movement of the two elements, and comprises a U-shaped armature, the ends of the two branches of which issue into the pressure pocket of the hydrostatic guide-block, whilst being slightly offset inside said pocket from the line joining the opposite edges of the border defining said pocket;

each magnet is an electro-magnet whose coil is connected to a device for adjusting the intensity of the magnetizing current.

The invention will be more readily understood on reading the following description with reference to the accompanying drawings, in which:

FIG. 1 is a cross-section, perpendicular to the plane of relative movement, of a device according to the prior art;

FIG. 2 is a view along II—II of FIG. 1; and

Figure 4:
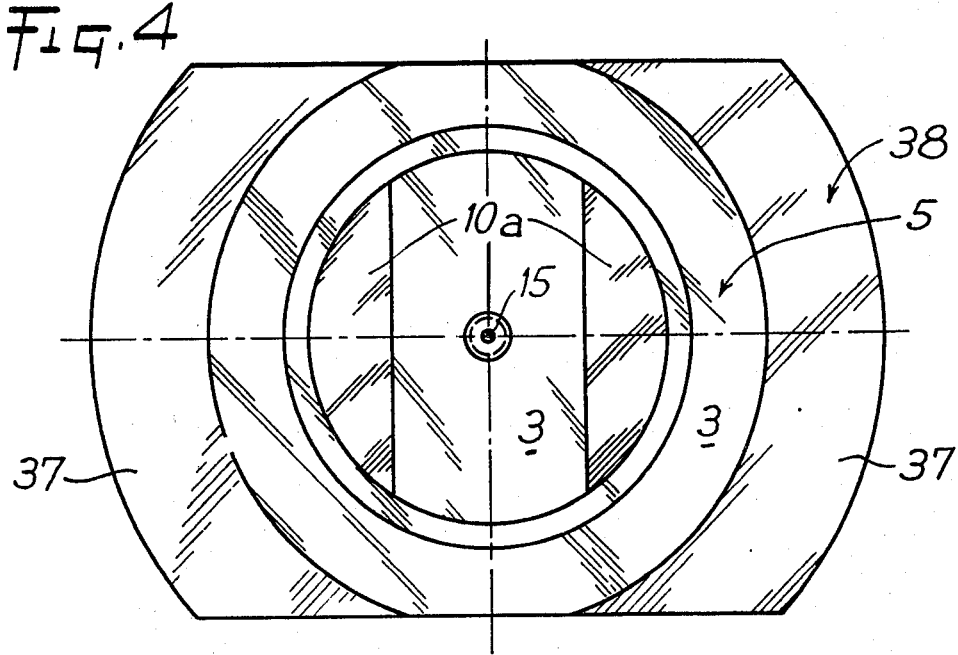
FIGS. 3 and 4 are cross-sections, similar to those shown in FIGS. 1 and 2, of an embodiment of the device according to the invention.

In the embodiment illustrated in FIGS. 1 and 2, two elements 1 and 2 are mounted so as to be movable one with respect to the other, whilst being capable of relative movements, in parallel to the direction D. The element 1 constitutes for example the movable carriage of a machine-tool, the element 2 constituting the support for said carriage.

A plurality of hydrostatic guide-blocks are interposed between the elements 1 and 2, one of which guide-blocks is shown and is composed of:

the body 3 of the guide-block, which is stationary with respect to the element 2, a cavity 4, which is provided in the body 3 and opens on to the face 5 of said body, which is parallel to a face 6 of the element 1 and which, furthermore, is flushed with the face 7 of the element 2 parallel to said face 6, the faces 5, 6 and 7 being also parallel to the direction D, the armature 8 of an electro-magnet, which is U-shaped and whose edges 9 at the ends of the branches 10 are parallel to the face 5 of the body 3, and slightly offset from the plane 11 covering the cavity 4 and traversing said face 5, the said branches 10 moreover issuing into the cavity 4, the coil 12 of the electro-magnet provided with its connecting terminals 13, a fluid pipe in several sections 14a, 14b, 14c, issuing into the cavity 4, a restriction 15, situated on the pipe section 14b which opens into the cavity 4, before said cavity, a pump 16, a two-position control valve 17, a conduit 18 connecting the control valve 17 to the pipe section 14a, the induction pipe 19 of the pump 16, which connects the said pump with a reservoir 20 of fluid, the delivery pipe 21 of the pump 16, connecting said pump to the control valve 17, a conduit 22, connecting the control valve 17 to the reservoir 20, a conduit 23, connecting the delivery pipe 21 to the reservoir 20, and, a calibrated discharge valve 24, placed on the conduit 23.

The pipe sections 14a, 14b and 14c are provided:

the section 14a in the element 2, the section 14b, in two parts separated by one of the branches 10 of the electro-magnet, inside the body 3 of the guide-block, the section 14c in the said branch 10 of the electro-magnet, in order to connect the two parts of the pipe section 14b.

The two positions of the control valve 17 correspond:

the first position, to creating a communication between the pipe 21 and the conduit 18, and, to closing the conduit 22; and, the second position, to creating a communication between the conduits 18, 21 and 22.

A fact to be noted is the symmetry existing with respect to the plane P perpendicular to the direction D: the branches 10 of the electro-magnet are arranged symmetrically with respect to said plane and on either sides thereof, whereas the body 3 of the guide-block and the cavity 4 provided therein, are cylindrical and circular, the plane P constituting a diametral plane thereof which furthermore traverses the axis of the restriction 15.

Obviously there is a clearance J between the faces 5 and 7 on the one hand, and the face 6 on the other hand, a fluid film flowing through said clearance into the cavity 4 and from there towards the outside thereof, to return for example to the reservoir 20 via a return pipe 26.

The terminals 13 of the electro-magnet are connected to a device 27 for adjusting the intensity of the magnetizing current. This adjustment may be effected by hand, but it can also be automatical and constitute a real control in position of the elements 1 and 2, one with respect to the other, by comprising for example: a sensor 28 for the position of these two elements, a measuring bridge 29 connected (35) to said sensor 28, and delivering a signal 30, a regulating device 31, which receives the signal 30 and an operating signal 32, and which, via an electrical power amplifier 33, is connected to the terminals 13. A source of electrical power 34 supplies all the members of the adjusting device 27.

With the constructive arrangements described hereinabove, it is understandable that the element 1 also has to be made from a magnetic or magnetizable material, in order to allow the lines of forces F of the electro-magnet to traverse the said element and to develop therein a pulling force towards the element 2.

When the control valve 17 is placed in its first position, the hydrostatic guide-block works as a guide and a support, which is its real function. If, in addition, the electro-magnet is supplied with electrical power, a force pulling the element 1 towards the element 2 is developed, this resulting in limiting the maximum value of the clearance J and in optimizing the operation of the hydrostatic guide-block, both where the accuracy of the guiding, and the conditions governing the laying of the fluid film in the clearance J, are concerned.

When an adjusting device 27 is provided, it is capable of regulating the value of the intensity of the magnetizing current, thereby permitting to obtain a substantially constant value for the clearance J.

It may happen that the lack of important variations in the load acting on the element 1 makes any regulation unnecessary. In this case, a simple permanent magnet will suffice instead of the illustrated electro-magnet.

Figure 3:
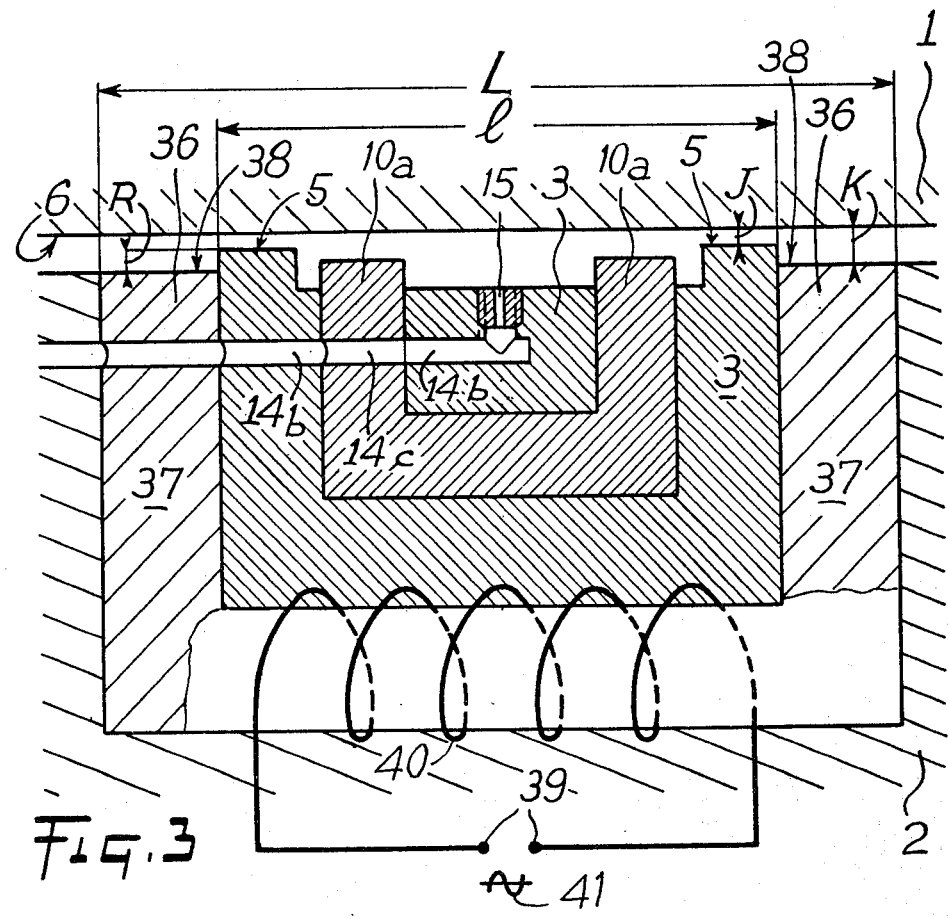

FIGS. 3 and 4 show an embodiment in which the aforedescribed main electro-magnet is replaced by a simple main magnet which is a permanent magnet, U-shaped with two branches 10a. But it should be noted in this variant, that an electro-magnet, known as secondary magnet, of large dimensions, has it poles 36 framing the body 3 of the guide-block. The maximum width L of the branches 37 of said electro-magnet is greater than the maximum width l of the guide-block. Moreover, the faces 38 of the poles 36 are offset in R with respect to the face 5 of the hydrostatic guide-block, thereby creating between them and the face 6 of the element 1, a clearance K which is considerably greater than the clearance J. Said secondary electro-magnet has the terminals 39 of its coil 40 connected to an A.C. source 41.

This embodiment works in the same way as that illustrated in FIGS. 1 and 2, with the added advantage of having a secondary electro-magnet (37–40). The function of the latter is to demagnetize the material delimiting the face 6 from the element 1, and this function is fulfilled owing to the alternative nature of its supply current. Thus any metal chips resulting from machining operations carried out by the machine-tool equipped with such a guide way, no longer risk to adhere permanently to the face 6 of the element 1, this eliminating one important disadvantage of the priorly known hydromagnetic guide-block combination.

The invention is in no way limited to the description given hereinabove and on the contrary covers any variants that could be made thereto without departing from the scope or the spirit thereof.

What is claimed is:

1. Hydrostatic support device for movably supporting one element above another element comprising: (a) at least one hydrostatic guide block mounted on one of said elements; (b) at least one magnet mounted on one of said elements such that the other element is traversed by the lines of magnetic forces thereby pulling the elements toward each other; and (c) demagnetizing means associated with the magnet, said demagnetizing means comprising an electromagnet electrically connected to an A.C. power source, and located such that the poles of the electromagnet extend beyond each hydrostatic guide block and are offset with respect to the active face of said guide block.

2. Hydrostatic device as claimed in claim 1 wherein the magnet: is associated with the hydrostatic guide-block; is mounted substantially symmetrically with respect to a median plane of the said hydrostatic guide-block taken perpendicular to the direction of relative movement of the two elements; and comprises a U-shaped armature, the ends of the two branches of which issue into a pressure pocket of the hydrostatic guide-block whilst being slightly offset inside said pocket from the line joining the opposite edges of the border delimiting the said pocket.

3. Hydrostatic device as claimed in claim 1, wherein each magnet also comprises an electro-magnet having a coil connected to a device for adjusting the intensity of the magnetizing current.

4. Hydrostatic device as claimed in claim 2, wherein each magnet also comprises an electromagnet having a coil connected to a device for adjusting the intensity of the magnetizing current.

5. Hydrostatic support device for movably supporting one element above another element comprising: (a) at least one hydrostatic guide block mounted on one of said elements; (b) at least one magnet mounted on one of said elements such that the other element is traversed by the lines of magnetic forces thereby pulling the elements toward each other, the magnet being mounted substantially symmetrically with respect to a median plane of said hydrostatic guide block taken perpendicular to the direction of relative movement of the two elements and comprising a U-shaped armature, the ends of the two branches of which issue into a pressure pocket of the hydrostatic guide block whilst slightly offset inside said pocket from the line joining the opposite edges of the border delimiting the said pocket; and (c) demagnetizing means associated with each magnet, said demagnetizing means comprising an electromagnet electrically connected to an A.C. power source.

6. Hydrostatic device as claimed in claim 5 wherein each magnet also comprises an electromagnet having a coil connected to a device for adjusting the intensity of the magnetizing current.

* * * * *